(12) United States Patent
Aokage

(10) Patent No.: US 8,259,229 B2
(45) Date of Patent: Sep. 4, 2012

(54) VIDEO SIGNAL PROCESSING APPARATUS AND METHOD THEREOF

(75) Inventor: Hironori Aokage, Yashio (JP)

(73) Assignee: Canon Kabushiki Kaisha, Tokyo (JP)

( * ) Notice: Subject to any disclaimer, the term of this patent is extended or adjusted under 35 U.S.C. 154(b) by 429 days.

(21) Appl. No.: 12/568,746

(22) Filed: Sep. 29, 2009

(65) Prior Publication Data

US 2010/0085479 A1    Apr. 8, 2010

(30) Foreign Application Priority Data

Oct. 8, 2008    (JP) ................................. 2008-262064

(51) Int. Cl.
*H04N 7/01* (2006.01)
(52) U.S. Cl. ........................................ 348/452; 348/458
(58) Field of Classification Search .......... 348/441–459, 348/699–702
See application file for complete search history.

(56) References Cited

U.S. PATENT DOCUMENTS

| 5,412,435 A | * | 5/1995 | Nakajima ..................... 348/699 |
| 5,699,499 A | * | 12/1997 | Kawada et al. ............... 345/475 |
| 2005/0212974 A1 | * | 9/2005 | Michel et al. ................. 348/699 |

* cited by examiner

*Primary Examiner* — Michael Lee
(74) *Attorney, Agent, or Firm* — Cowan, Liebowitz & Latman, P.C.

(57) ABSTRACT

A motion amount at a pixel position to be interpolated of a field of interest is calculated. A difference coefficient between frames is calculated based on video signals of two fields which are adjacent to the field of interest and are separated by one frame. A motion intensity between fields is calculated based on video signals of the field of interest and a field after the field of interest. The motion amount is corrected using a predetermined function. The corrected motion amount is corrected again based on the difference coefficient and motion intensity.

8 Claims, 10 Drawing Sheets

PREVIOUS FIELD P     FIELD OF INTEREST C     NEXT FIELD N

VIDEO SIGNAL PROCESSING APPARATUS AND METHOD THEREOF

BACKGROUND OF THE INVENTION

1. Field of the Invention

The present invention relates to video signal processing for converting an interlaced-scanning video signal into a progressive-scanning video signal.

2. Description of the Related Art

General video processing apparatuses handle interlaced-scanning video signals. In case of an NTSC (National Television System Committee) system, since one frame is interlaced-scanned by representing it using 525 scanning lines, one field is defined by 262.5 scanning lines. In this case, this value has a fraction of 0.5 lines below the decimal point, and this indicates that when the scanning position returns to the upper left position of a screen to make the next scan after one scan, the scan start position is shifted by the 0.5 scanning lines. As a result, the positions of scanning lines of the first scan and those of the second scan are shifted to display 525 scanning lines by combining the two scans. In this manner, fields are images which are alternately shifted in the vertical direction. In general, an even-numbered field is called an even field, and an odd-numbered field is called an odd field.

On the other hand, as a scanning method different from the interlaced scan, a progressive scan is known. The progressive scan is a system for scanning in the arrangement order of pixels. For example, the progressive scan is made in a plasma display panel (PDP), liquid crystal display (LCD), and image display panel using light-emitting diodes (LEDs) (to be referred to as an LED panel hereinafter). Therefore, in order to display an interlaced-scanning video on an image display apparatus such as a PDP, LCD, or LED panel which makes the progressive scan, processing for converting an interlaced-scanning video signal into a progressive-scanning video signal is required. This processing is generally called IP conversion (interlace to progressive conversion).

Various methods of the IP conversion are known. Recently, in order to enhance image quality, motion adaptive IP conversion is used. With this motion adaptive IP conversion, a motion amount of an object is detected from the difference between pixel data between fields, and line data is adaptively generated according to the motion amount.

The motion adaptive IP conversion executes intra-field interpolation for a moving object, and inter-field interpolation for a still object. More specifically, an image of a field, line data of which is to be generated (to be referred to as a field of interest hereinafter) is interpolated to generate image data suited to a moving picture (to be referred to as interpolation data for a moving picture hereinafter). Also, images of two fields including the field of interest are interpolated to generate image data suited to a still picture (to be referred to as interpolation data for a still picture hereinafter). The interpolation data for a moving picture and that for a still picture are adaptively mixed based on changes in pixel included in a field, thereby generating line data.

The IP conversion which generates image data by mixing the interpolation data for a moving picture and that for a still picture is classified into field difference type motion adaptive IP conversion and frame difference type motion adaptive IP conversion, depending on the factor based on which the mixture ratio of these data is decided.

The field difference type motion adaptive IP conversion decides a mixture ratio based on the difference (to be referred to as a difference between fields) between a pixel to be interpolated (to be referred to as an interpolating pixel hereinafter) of the field of interest and a corresponding pixel of one of fields before and after the field of interest (to be referred to adjacent fields hereinafter). When the difference between fields is large, a high mixture ratio of the interpolation data for a moving picture is set; otherwise, a high mixture ratio of the interpolation data for a still picture is set.

On the other hand, the frame difference type motion adaptive IP conversion decides a mixture ratio based on the differences (to be referred to as differences between frames) between the interpolating pixel of the frame of interest and corresponding pixels of frames before and after the frame of interest (to be referred to as adjacent frames hereinafter). When the differences between frames are large, a high mixture ratio is set for the interpolation data for a moving picture; otherwise, a high mixture ratio is set for the interpolation data for a still picture.

As a merit of these field difference type motion adaptive IP conversion and frame difference type motion adaptive IP conversion, the number of fields required to implement the IP conversion is small. That is, the number of fields required for the field difference type motion adaptive IP conversion is 2, and that required for the frame difference type motion adaptive IP conversion is 3. As a consequence, the memory size of a field memory required to implement the IP conversion can be reduced, thus allowing inexpensive implementation.

Since the field difference type motion adaptive IP conversion uses the field of interest and adjacent fields, it is characterized in that the time resolution is higher than the frame difference type motion adaptive IP conversion, and high-precision IP conversion can be attained in a time direction.

In the motion adaptive IP conversion, when the mixture ratio is decided assuming a moving picture, interpolation processing for a moving picture that executes intra-field interpolation lowers the resolution of an image in the vertical direction. When a moving picture is determined as a still picture by mistake, a video for one frame is generated from data of two different fields according to motion, thus considerably degrading image quality (for example, the edge of an object suffers jaggy, horizontal stripes stand out, an object doubles in some cases, and so forth). The field difference type motion adaptive IP conversion inherits such characteristics of motion adaptive IP conversion processing.

SUMMARY OF THE INVENTION

In one aspect, a video signal processing method of detecting a motion amount of an object on converting an interlaced-scanning video signal into a progressive-scanning video signal, comprising the steps of: calculating the motion amount at a pixel position to be interpolated of a field of interest; calculating a difference coefficient between frames based on video signals of two fields, which are adjacent to the field of interest and are separated by one frame; calculating a motion intensity between fields based on video signals of the field of interest and a field after the field of interest; correcting the motion amount using a predetermined function; and correcting the motion amount corrected in the first correcting step, based on the difference coefficient and the motion intensity.

According to the aspect, when an interlaced-scanning video signal is converted into a progressive-scanning video signal, a motion amount of an object can be detected with high precision from the interlaced-scanning video signal.

Further features of the present invention will become apparent from the following description of exemplary embodiments with reference to the attached drawings.

DESCRIPTION OF THE EMBODIMENTS

Video signal processing according to embodiments of the present invention will be described in detail hereinafter with reference to the drawings. In the following description, a luminance signal of a video signal is used as an object to be processed for the sake of simplicity. However, the present invention is not limited to this, and color difference signals of a video signal can also be processed by the same arrangement.
First Embodiment
[Arrangement of Motion Amount Detector]

Figure 1:
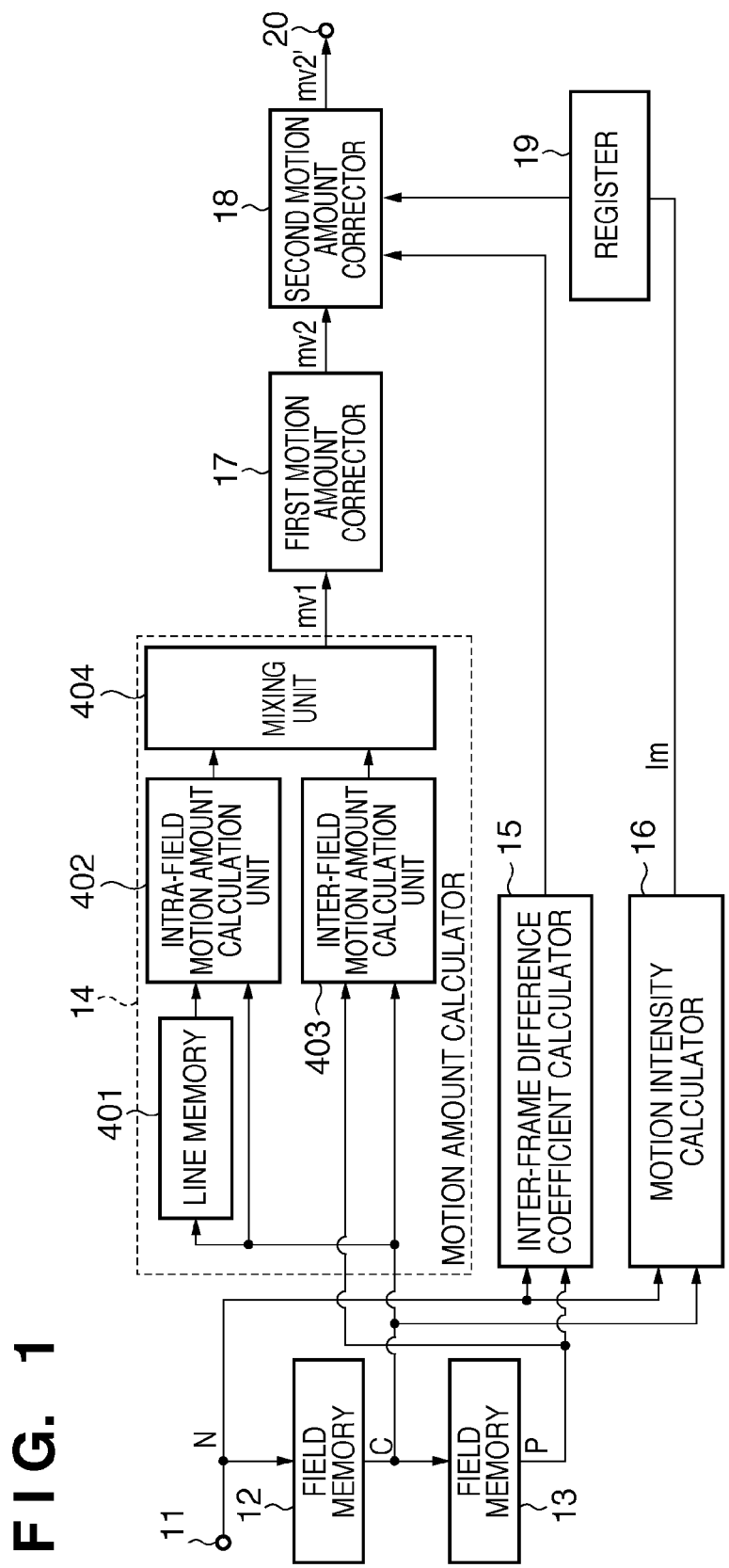
FIG. 1 is a block diagram showing the arrangement of a motion amount detector of a video signal processing apparatus according to an embodiment.

FIG. 1 is a block diagram showing the arrangement of a motion amount detector of a video signal processing apparatus according to this embodiment.

Each of field memories 12 and 13 has a memory capacity that stores an interlaced signal for one field, which is input from an input terminal 11.

A motion amount calculator 14 calculates a first motion amount between fields. An inter-frame difference coefficient calculator 15 computes difference absolute values between fields which are separated by an arbitrary two-field (one frame) time, thereby calculating an inter-frame difference coefficient. A motion intensity calculator 16 calculates the motion intensity of the entire field.

A first motion amount corrector 17 corrects the first motion amount using a predetermined function, and outputs the correction result as a second motion amount. A second motion amount corrector 18 corrects the second motion amount based on the inter-frame difference coefficient calculated by the inter-frame difference coefficient calculator 15, and the motion intensity which is calculated by the motion intensity calculator 16 and is delayed for one field by a register 19, and outputs the correction result as a corrected motion amount.

A line memory 401 of the motion amount calculator 14 has a memory capacity that stores an interlaced signal for one line, which is input from the input terminal 11. An intra-field motion amount calculation unit 402 calculates an intra-field motion amount. An inter-field motion amount calculation unit 403 calculates an inter-field motion amount. A mixing unit 404 calculates the ratio between the intra-field motion amount and inter-field motion amount, and outputs the calculation result as the first motion amount.
[Processing of Motion Amount Detector]

An interlaced-scanning video signal (which is a luminance signal without any color components for the sake of simplicity) input to the input terminal 11 is supplied to the field memory 12, inter-frame difference coefficient calculator 15, and motion intensity calculator 16.

The field memory 12 delays the video signal by a one-field time, and outputs the delayed video signal to the field memory 13, line memory 401, intra-field motion amount calculation unit 402, inter-field motion amount calculation unit 403, and motion intensity calculator 16. The field memory 13 delays the video signal by another one-field time, and outputs the video signal delayed by the two-field (one-frame) time to the inter-frame difference coefficient calculator 15 and inter-field motion amount calculation unit 403.

Note that a field which is delayed by the two-field time will be referred to as a previous field P, a field which is delayed by the one-field time will be referred to as a field of interest C, and a field input to the input terminal 11 will be referred to as a next field N hereinafter.

As will be described in detail later, the inter-frame difference coefficient calculator 15 receives several pixels around pixels corresponding to an interpolating pixel of the previous field P and next field N, and calculates difference absolute values between pixels at identical positions. When each difference absolute value is smaller than a predetermined threshold, the inter-frame difference coefficient calculator 15 determines that pixel position as "still". When the number of pixel positions which are determined as "still" between the previous field P and next field N is larger than a predetermined threshold, the inter-frame difference coefficient calculator 15 determines the position of the interpolating pixel between these fields as "still", and outputs an inter-frame difference coefficient '1'. When the position of the interpolating pixel is not determined as "still", the inter-frame difference coefficient calculator 15 outputs an inter-frame difference coefficient '0'. As will be described in detail later, the motion intensity calculator 16 receives several pixels of a region of interest of the field of interest C, and several pixels corresponding to the region of interest of the next field N, and calculates how many high-frequency components in the vertical direction are included when these pixels are considered as frame structures. When the calculated value is larger than a predetermined threshold, the motion intensity calculator 16 determines the corresponding block as a bad block. The motion intensity calculator 16 repeats, for one field, processing for a block, counts the number of bad blocks, and outputs the count result as the motion intensity.

The intra-field motion amount calculation unit 402 receives video signals of lines above and below a line on which the interpolating pixel is located (to be referred to as adjacent lines hereinafter). The intra-field motion amount calculation unit 402 calculates a difference absolute value as an intra-field motion amount from values of pixels which are adjacent to the interpolating pixel (to be referred to as adjacent pixels hereinafter), and outputs the calculated motion amount to the mixing unit 404. The inter-field motion amount calculation unit 403 receives a video signal of the field of interest C and that of the previous field P. The inter-field motion amount calculation unit 403 calculates a difference absolute value as an inter-field motion amount from the average value of adjacent pixels or the value of one of the adjacent pixels, and the value of a pixel corresponding to the interpolating pixel of the previous field P, and outputs the calculated motion amount to the mixing unit 404. The mixing unit 404 receives the intra-field motion value and inter-field motion value, and outputs their ratio (continuous values within the range from 0 indicating "still" to 1 indicating "motion") as the first motion amount.

The first motion amount corrector 17 has, as its input/output characteristics, S-characteristics (characteristics in which an output moderately increases from 0 and increases abruptly in a middle part, and the increase becomes moderate as the output becomes closer to 1), and outputs a motion amount given with the characteristics as the second motion amount. The second motion amount corrector 18 outputs, as the corrected motion amount, the second motion amount, which is corrected based on the inter-frame difference coefficient and the motion intensity delayed for one field by the register 19. That is, the second motion amount corrector 18 corrects the second motion amount based on the motion intensity which is delayed by the one-field time when the inter-frame difference coefficient is '1' indicating "still".

Inter-Frame Difference Coefficient Calculator

Figure 2:
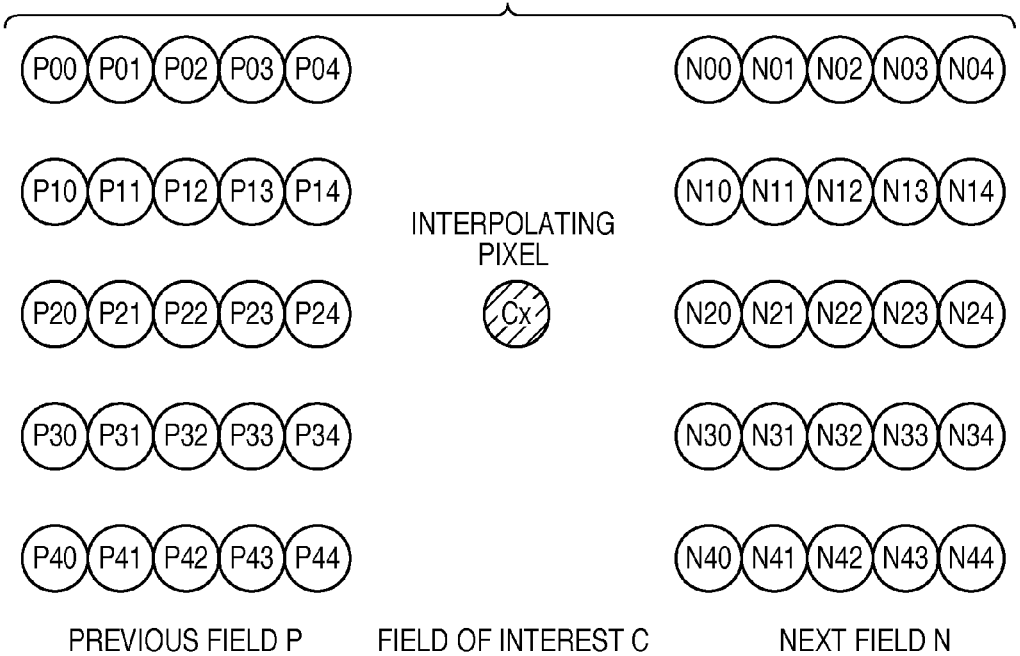
FIG. 2 is a view for explaining the calculation of an inter-frame difference coefficient.

The inter-frame difference coefficient calculator 15 receives 5×5 pixels Pij (i, j=0 to 4) having a pixel P22 of the previous field P as the center, which pixel corresponds to an interpolating pixel Cx, as shown in, e.g., FIG. 2. Also, the inter-frame difference coefficient calculator 15 receives 5×5 pixels Nij (i, j=0 to 4) having a pixel N22 of the next field N as the center.

The inter-frame difference coefficient calculator 15 calculates difference absolute values Rij=|Pij−Nij| between pixel values of pixel pairs at identical positions of the previous field P and the next field N. The inter-frame difference coefficient calculator 15 compares each value Rij with a predetermined threshold fs_th. If Rij<fs_th, the inter-frame difference coefficient calculator 15 increments a counter fs_count. Note that an initial value of the counter fs_count is 0. Upon completion of the difference absolute values Rij of the 5×5 pixels with the threshold fs_th, the inter-frame difference coefficient calculator 15 compares the value of the counter fs_count with a predetermined threshold ct_th. If fs_count >ct_th, the inter-frame difference coefficient calculator 15 sets an inter-frame difference coefficient to be '1'; otherwise, it sets an inter-frame difference coefficient to be '0'.

An example in which the inter-frame difference coefficient is calculated between the previous field P and the next field N has been explained for the sake of simplicity. However, the inter-frame difference coefficient calculator 15 may calculate an inter-frame difference coefficient or coefficients further using the field of interest C and fields or a field which are or is separated by the two-field time (one-frame time) before and/or after the field of interest C. That is, inter-frame difference coefficients may be calculated from two fields which are adjacent to the field of interest C and are separated by one frame. When a plurality of inter-frame difference coefficients are calculated, the inter-frame difference coefficient calculator 15 outputs their logical product as an inter-frame difference coefficient.

Motion Intensity Calculator

Figure 3:
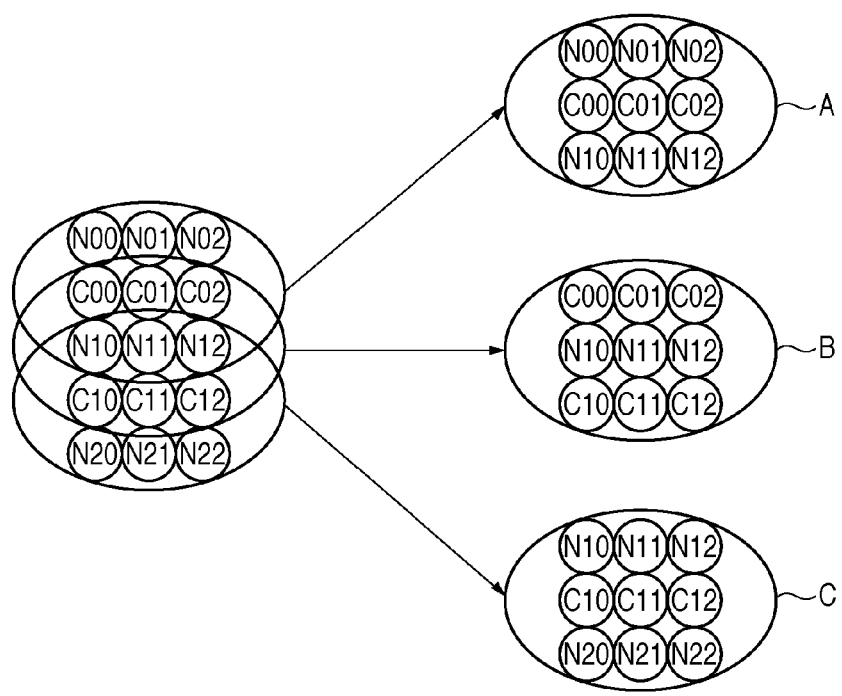
FIG. 3 is a view for explaining the calculation of a motion intensity.

The motion intensity calculator 16 receives 3×2 pixels Cij (i=0 to 1, j=0 to 2) included in a region of interest of the field of interest C, and 3×3 pixels Nij (i, j=0 to 3) of a motion amount calculation target region of the next field N, as shown in, e.g., FIG. 3. Note that in FIG. 3, pixels of the next field N are denoted by the same reference numerals as in FIG. 2, but they do not have any correlation. The size of the region of interest shown in FIG. 3 is an example.

The motion intensity calculator 16 forms three frame structures (respectively called blocks) using the pixels of the field of interest C and the next field N, as shown in FIG. 3. The motion intensity calculator 16 then makes the following arithmetic operations in blocks A, B, and C shown in FIG. 3.

$$
\begin{aligned}
&\text{if (block A)\{} \\
&\quad A1 = \min(|N00\text{-}C00|, |N01\text{-}C01|, |N02\text{-}C02|); \\
&\quad A2 = \min(|C00\text{-}N10|, |C01\text{-}N11|, |C02\text{-}N12|); \\
&\quad A3 = \min(|N00\text{-}N10|, |N01\text{-}N11|, |N02\text{-}N12|); \\
&\quad SA = A1 + A2 - A3; \\
&\text{\}} \\
&\text{if (block B)\{} \\
&\quad B1 = \min(|C00\text{-}N10|, |C01\text{-}N11|, |C02\text{-}N12|); \\
&\quad B2 = \min(|N10\text{-}C10|, |N11\text{-}C11|, |N12\text{-}C12|); \\
&\quad B3 = \min(|C00\text{-}C10|, |C01\text{-}C11|, |C02\text{-}C12|); \\
&\quad SB = B1 + B2 - B3; \\
&\text{\}} \\
&\text{if (block C)\{} \\
&\quad C1 = \min(|N10\text{-}C10|, |N11\text{-}C11|, |N12\text{-}C12|); \\
&\quad C2 = \min(|C10\text{-}N20|, |C11\text{-}N21|, |C12\text{-}N22|); \\
&\quad C3 = \min(|N10\text{-}N20|, |N11\text{-}N21|, |N12\text{-}N22|); \\
&\quad SC = C1 + C2 - C3; \\
&\text{\}}
\end{aligned} \quad (1)
$$

where min( ) is a function that outputs a minimum value.

Furthermore, the motion intensity calculator 16 calculates a score S of the input, based on the arithmetic results of the respective blocks, according to:

$$M1 = \min(SA, SB);$$

$$M2 = \min(SB, SC);$$

$$S = \max(M1, M2); \quad (2)$$

where max( ) is a function that outputs a maximum value.

Then, the motion intensity calculator 16 compares the score S with a predetermined threshold bad_th. If S>bad_th, the motion intensity calculator 16 determines this input as a bad block. The motion intensity calculator 16 repeats the aforementioned processing for the entire field, and counts the number bad_count of bad blocks for one field. Then, the motion intensity calculator 16 calculates a motion intensity Im by:

$$Im = \text{bad\_count}/\text{bad\_count\_max} \quad (3)$$

where bad_count_max is a count value when all the blocks for one field are bad blocks.

That is, the motion intensity calculator 16 calculates, as the motion intensity, the intensity of an artifact generated in the frame structures generated from the field of interest C and the next field N.

First Motion Amount Corrector

Figure 4:
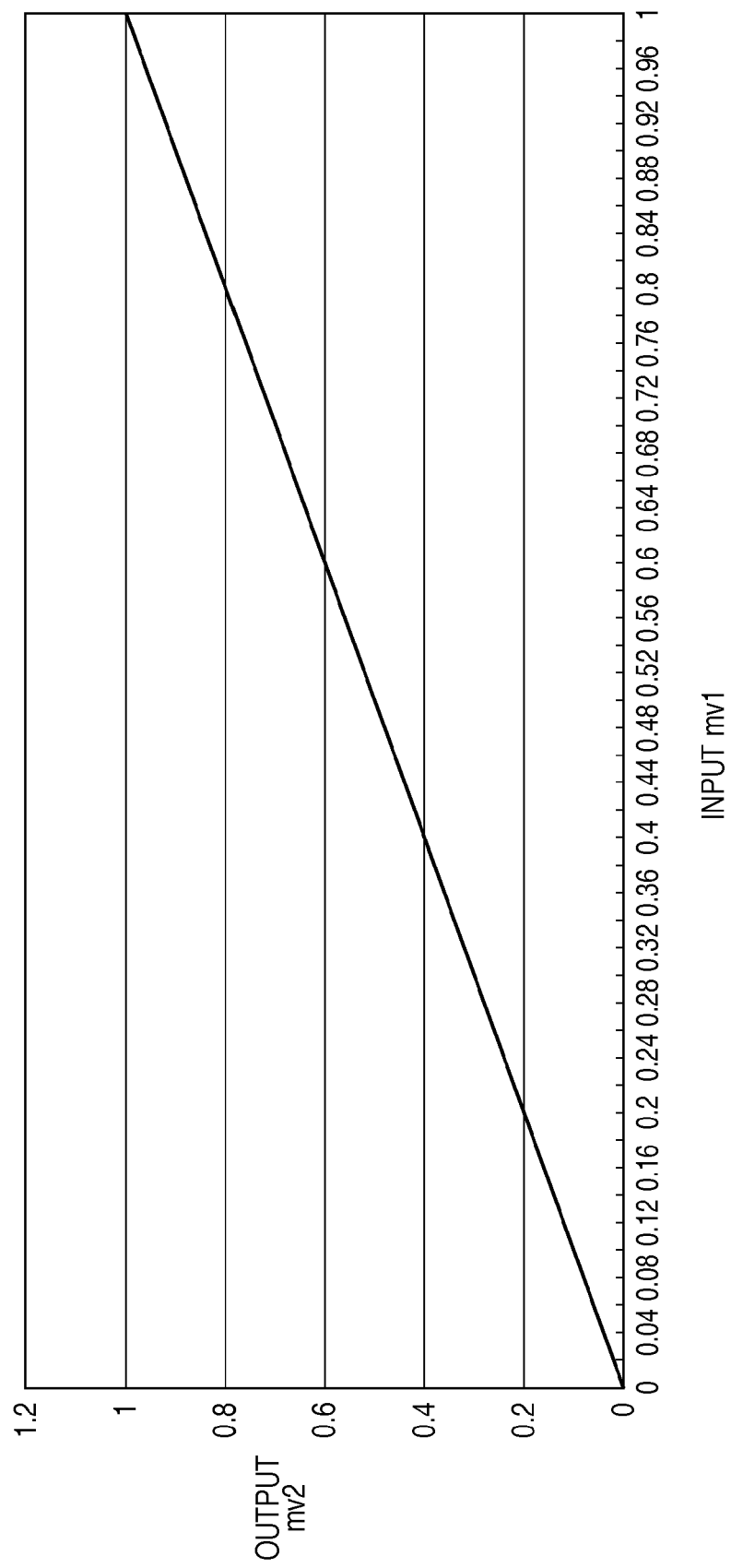
FIG. 4 is a graph showing the input/output characteristics of a first motion amount corrector when a first motion amount is not corrected.
Figure 5:
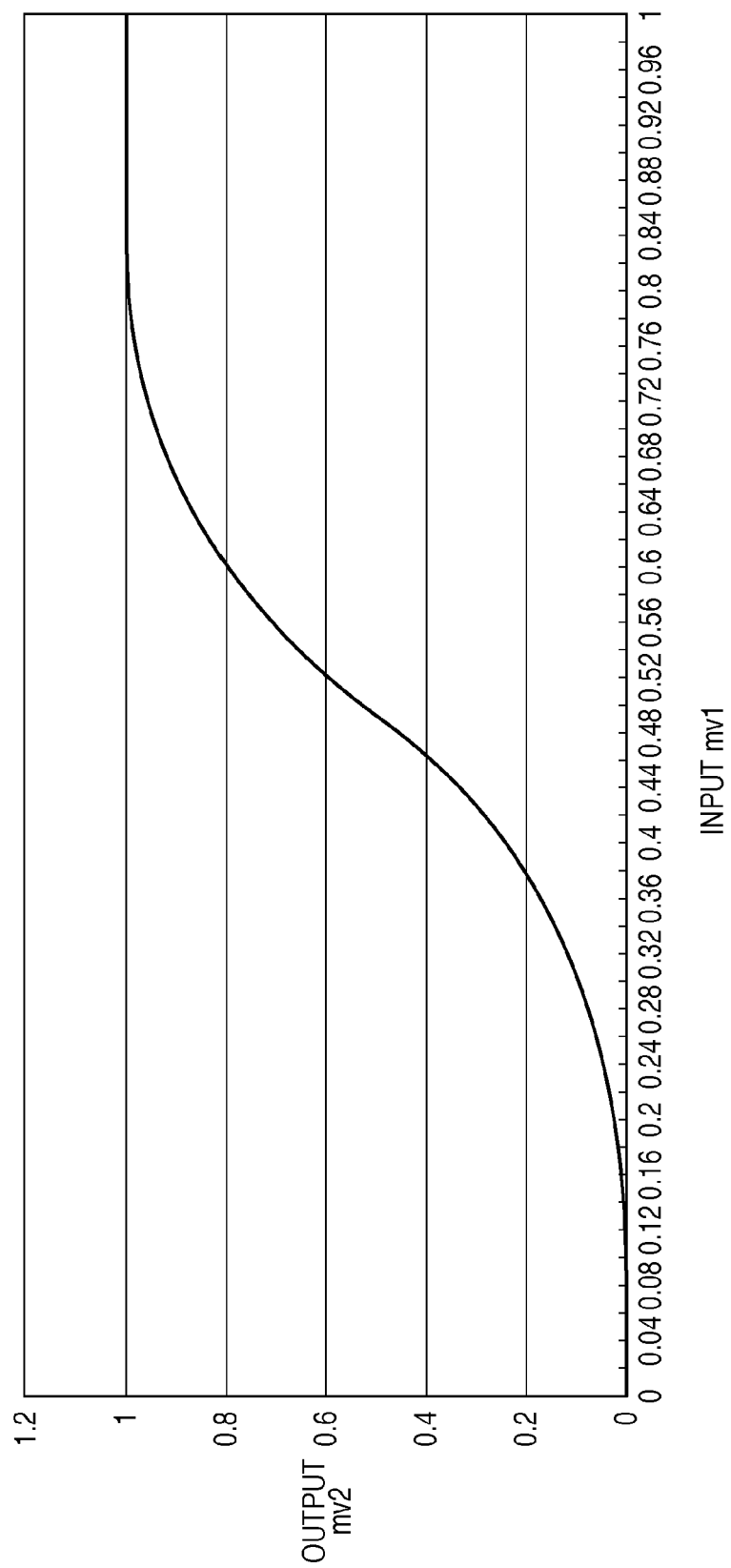
FIG. 5 is a graph showing an example of the S-characteristics of the first motion amount corrector when the first motion amount is corrected.

FIG. 4 is a graph showing the (linear) input/output characteristics of the first motion amount corrector 17 when the first motion amount is not corrected. FIG. 5 is a graph showing an example of the aforementioned S-(curved) characteristics of the first motion amount corrector 17 when the first motion amount is corrected. The S-characteristics are expressed by a function given by:

$$mv2 = \{1 + 1/e^{1.5 \times (8 \times mv1 - 4)}\}^{-1} \quad (4)$$

where mv1 is the first motion amount, and
mv2 is the second motion amount.

Figure 6:
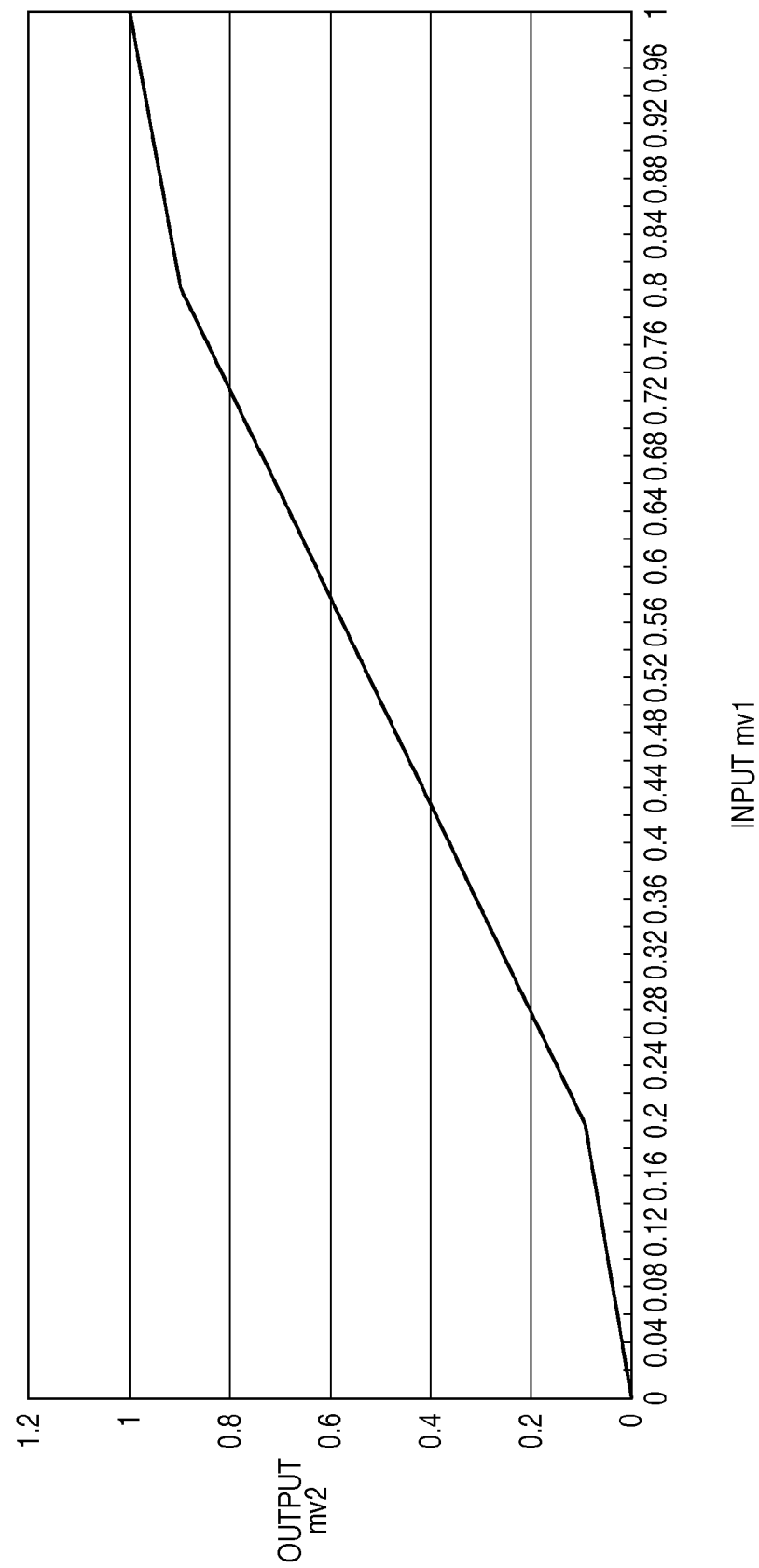
FIG. 6 is a graph showing another example of the input/output characteristics of the first motion amount corrector when the first motion amount is corrected.

Note that when the continuity of the second motion amount mv2 is not taken into consideration, polygonal line graph-like input/output characteristics shown in FIG. 6 may be used. That is, the function used by the first motion amount corrector 17 preferably has characteristics that converge the motion amount to a lower limit when the motion amount mv1 assumes a value around the lower limit, and converge the motion amount to an upper limit when the motion amount mv1 assumes a value around the upper limit.

Second Motion Amount Corrector

The motion intensity output from the motion intensity calculator 16 is accumulated for one field on the register 19. While the register 19 accumulates the motion intensities of the field of interest C, it outputs the motion intensities of the previous field P. In other words, when the motion intensity of the next field begins to be input, the motion intensity input to the second motion amount corrector 18 is updated.

Figure 7:
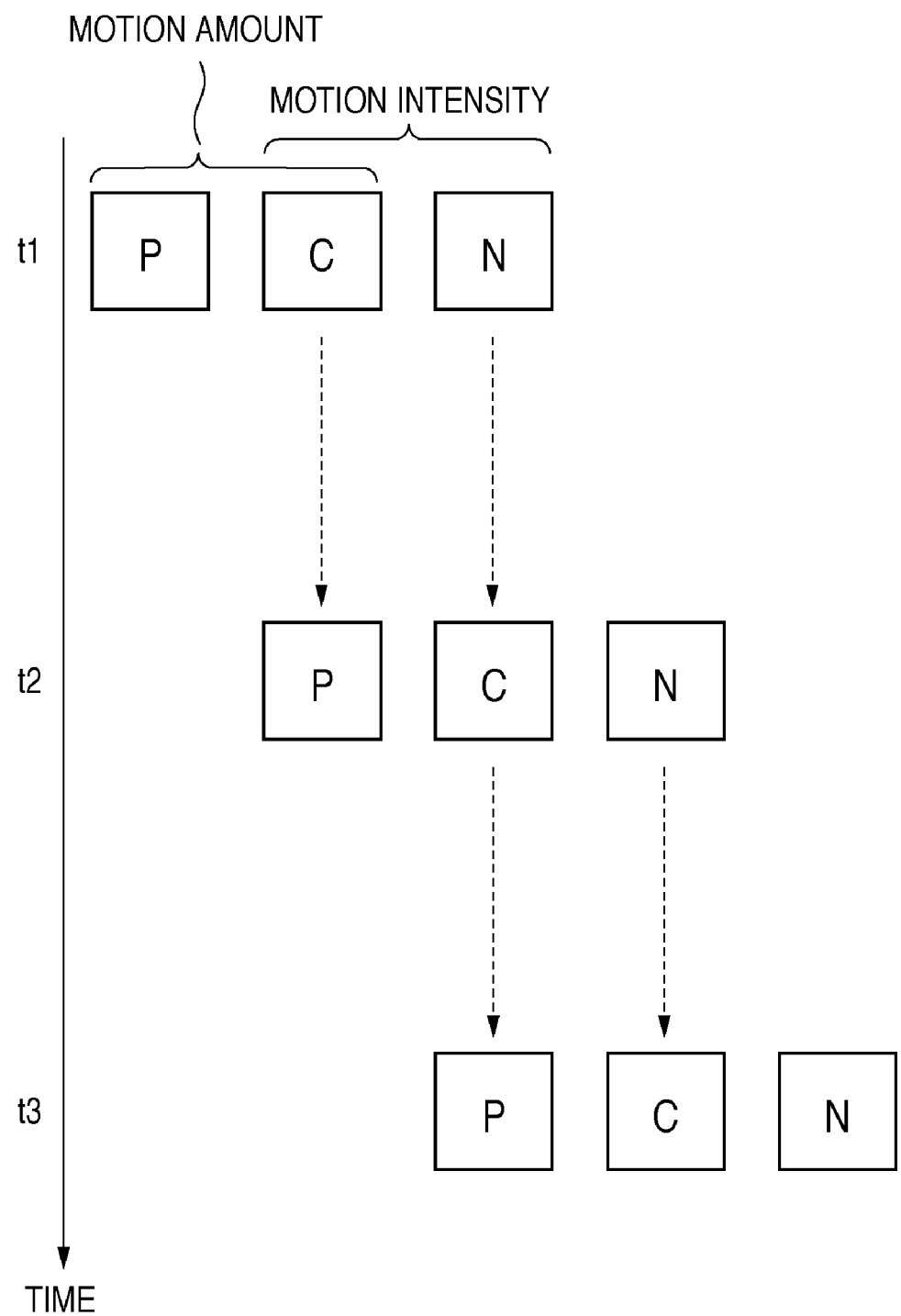
FIG. 7 is a view showing the relationship in the time direction between the calculations of motion intensities and those of motion amounts.

FIG. 7 is a view showing the relationship in the time direction between the calculations of motion intensities and those of motion amounts.

At time t1, the motion amount is calculated from the previous field P and the field of interest C, and the motion intensity is calculated from the field of interest C and the next field N. The motion intensity is delayed by the one-field time, and is applied to correction of the second motion amount of the field of interest C at time t2. Since the second motion amount is based on the first motion amount calculated using the previous field P and the field of interest C, fields from which the motion intensity and motion amount are calculated are matched by delaying the motion intensity.

The second motion amount corrector 18 does not correct the second motion amount when the inter-frame difference coefficient is '0'. When the inter-frame difference coefficient is '1', the second motion amount corrector 18 corrects the second motion amount by:

$$\text{if (inter-frame difference coefficient == '1') \{} \quad (5)$$
$$mv2' = mv2 \times Im;$$
$$\}$$

where mv2' is the corrected motion amount, and
Im is the motion intensity (0<Im≦1).

As described above, the motion amount detector applies two stages of corrections to the motion amount based on the calculations of the intra-field and inter-field difference values. For example, a modification of a sigmoid function (for example, a function shown in FIG. 5 and given by equation (4)) is applied to the motion amount to converge the motion amount to "motion" or "still" (first correction). Furthermore, necessity/unnecessity of correction is determined using the inter-frame difference information. When correction is to be applied, the motion amount is corrected using the motion intensities of the entire field (second correction). Therefore, a motion amount for each pixel is detected with high precision, and a moving object and still object in an image can be precisely detected and separated.

Note that the motion amount detector receives an interlaced-scanning video signal, and detects a motion amount at the position of an interpolating pixel located on a line to be interpolated. Hence, the motion amount detector does not detect any motion amount during scanning on an existing line of the field of interest. The arrangement example which independently includes the line memory and field memories has been explained. However, a part of the field memory may be used as the line memory. Also, the interlaced scan of 1:2 has been explained. However, the present invention is not limited to this, and is applicable to interlaced scans of other ratios.

Second Embodiment

Video signal processing according to the second embodiment of the present invention will be described below. Note that the same reference numerals in the second embodiment denote the same components as in the first embodiment, and a detailed description thereof will not be repeated.

The second embodiment will explain an IP conversion apparatus which includes the motion amount detector of the first embodiment.

Figure 8:
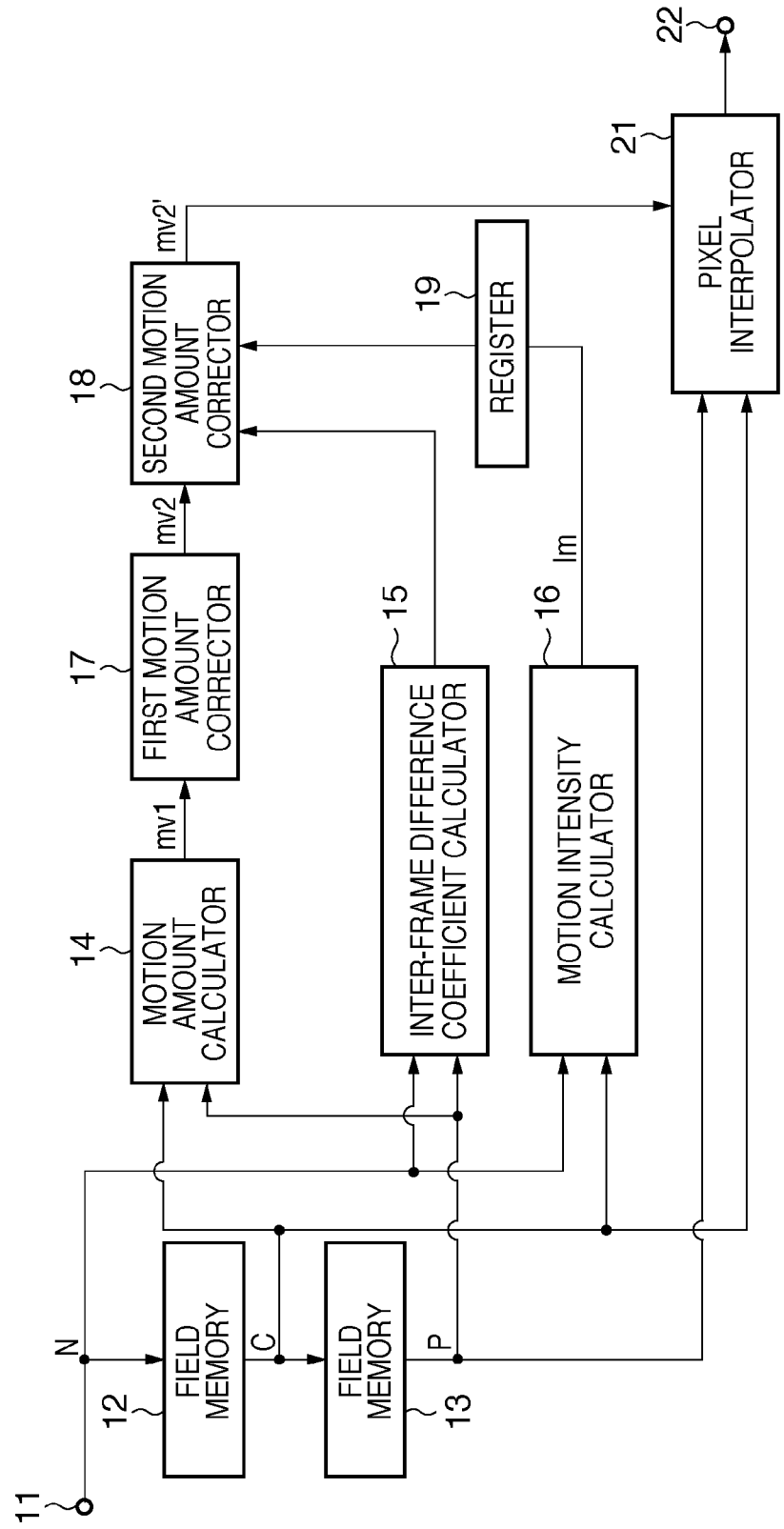
FIG. 8 is a block diagram showing the arrangement of an IP conversion apparatus according to the second embodiment.

FIG. 8 is a block diagram showing the arrangement of an IP conversion apparatus according to the second embodiment. Unlike the arrangement shown in FIG. 1, the IP conversion apparatus includes a pixel interpolator 21.

The pixel interpolator 21 receives pixels required for interpolation from the field memories 12 and 13. That is, the pixel interpolator 21 receives the value of one pixel selected from adjacent pixels (two pixels having the same x-coordinate as an interpolating pixel) located on adjacent lines of a line on which the interpolating pixel of a field of interest C, delayed by a one-field time, is located, or the average value of these two pixels, from the field memory 12. Furthermore, the pixel interpolator 21 receives the value of a pixel at the same position as the interpolating pixel of a previous field P, which is delayed by a two-field time, from the field memory 13. The pixel interpolator 21 mixes the two input pixel values with an output mv2' from the second motion amount corrector 18 based on:

$$p' = mv2' \times p_p + (1 - mv2') \times p_c \quad (6)$$

where p' is the interpolating pixel value,
$p_p$ is the pixel value of the previous field P,
$p_c$ is the pixel value of the field of interest C, and
mv2' is the corrected motion value (0<mv2'≦1).

Then, the pixel interpolator 21 outputs the mixing result as an interpolating pixel value from an output terminal 22. Note that the output destination of the interpolating pixel is a progressive-scan display apparatus (not shown).

In this way, the motion amount detector detects a motion amount for each pixel with high precision, and continuously calculates an interpolating pixel. Hence, a region including a moving object can be prevented from being erroneously determined, and image quality deterioration such as motion blur can be reduced. In a region including a still object, a resolution drop can be prevented, and line flickers and the like can be reduced.

Third Embodiment

Video signal processing according to the third embodiment of the present invention will be described below. Note that the same reference numerals in the third embodiment denote the same components as in the first and second embodiments, and a detailed description thereof will not be repeated.

The IP conversion apparatus of the second embodiment can be implemented by supplying a computer program to a general-purpose information processing apparatus such as a personal computer. The third embodiment will explain such implementation.

[Apparatus Arrangement]

Figure 9:
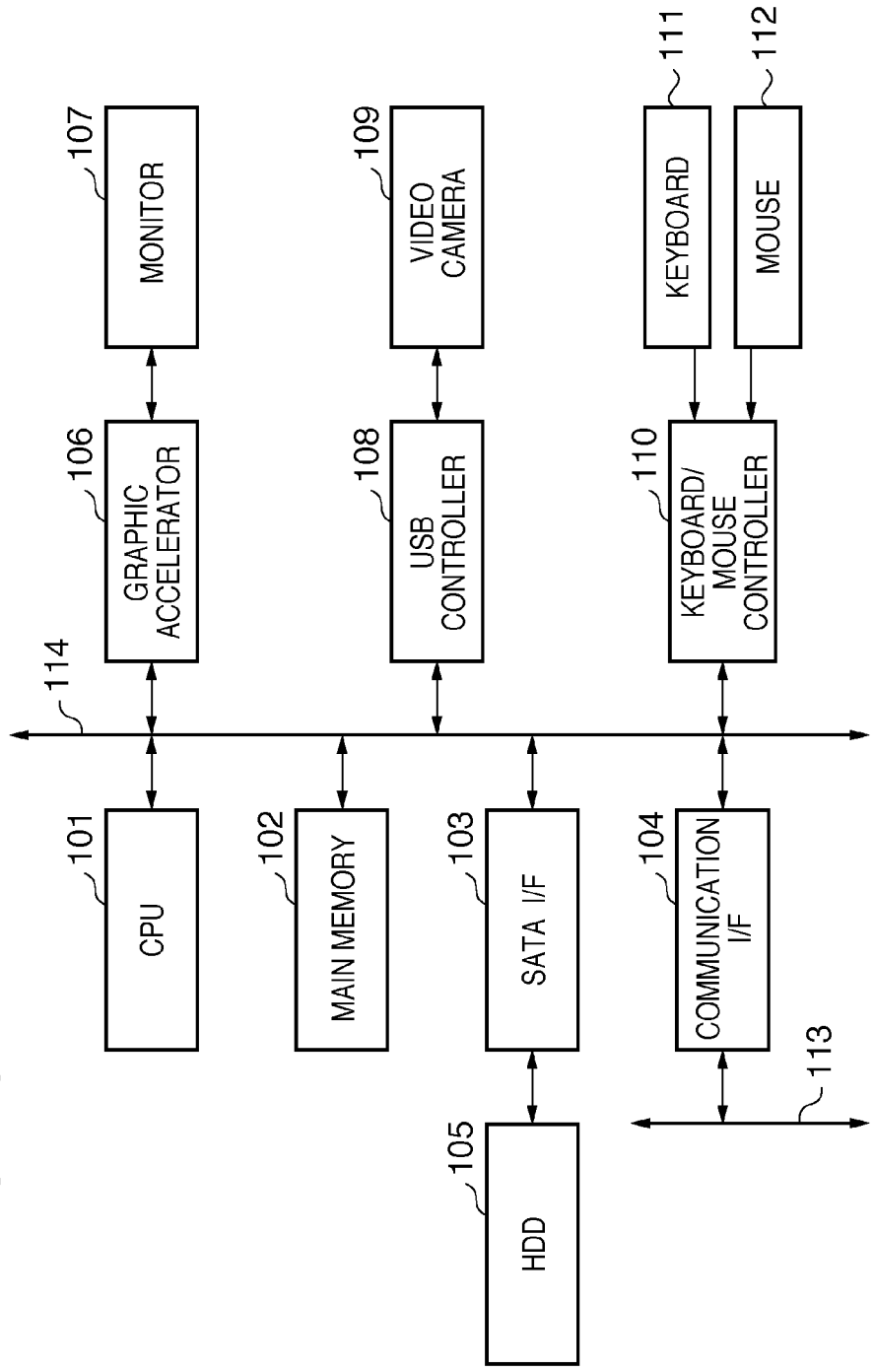
FIG. 9 is a block diagram showing the arrangement of an information processing apparatus according to the third embodiment.

FIG. 9 is a block diagram showing the arrangement of an information processing apparatus according to the third embodiment.

A microprocessor (CPU) 101 executes an operating system (OS) and various programs stored in a read-only memory (ROM) of a main memory 102 and a hard disk drive (HDD) 105 using a random access memory (RAM) of the main memory 102 as a work memory. Then, the CPU 101 controls respective units via a system bus 114 such as a PCI (peripheral component interconnect) bus. Furthermore, the CPU 101 executes various programs including a video processing application (to be described later).

The CPU 101 accesses the HDD 105 via the system bus 114 and a serial ATA interface (SATA I/F) 103. Also, the CPU 101 accesses a network 113 such as a local area network (LAN) via a communication I/F 104. Note that the communication I/F 104 is connected not only to the network 113, but also to a public line or wireless line, and can receive a broadcast wave and the like.

In the following description, the CPU 101 reads out programs and various data from the HDD 105. Alternatively, the CPU 101 can also read out programs and data from a server on the network 113.

The CPU 101 displays a user interface (UI) and processing results on a monitor 107 via a graphic accelerator 106, and receives user instructions via a keyboard 111 and mouse 112 connected to a keyboard/mouse controller 110. Note that the monitor 107 is a progressive-scan display apparatus.

The CPU 101 receives video signals for respective fields from a video camera 109 connected via, for example, a USB (Universal Serial Bus) controller 108 and a serial bus.

[Video Signal Processing]

The user operates the UI to instruct to input video signals of the video camera 109 and to display a video sensed by the video camera 109 onto the monitor 107. The CPU 101 loads a video processing application program from the HDD 105 onto the main memory 102 and executes video signal processing in accordance with the user instruction.

Figure 10:
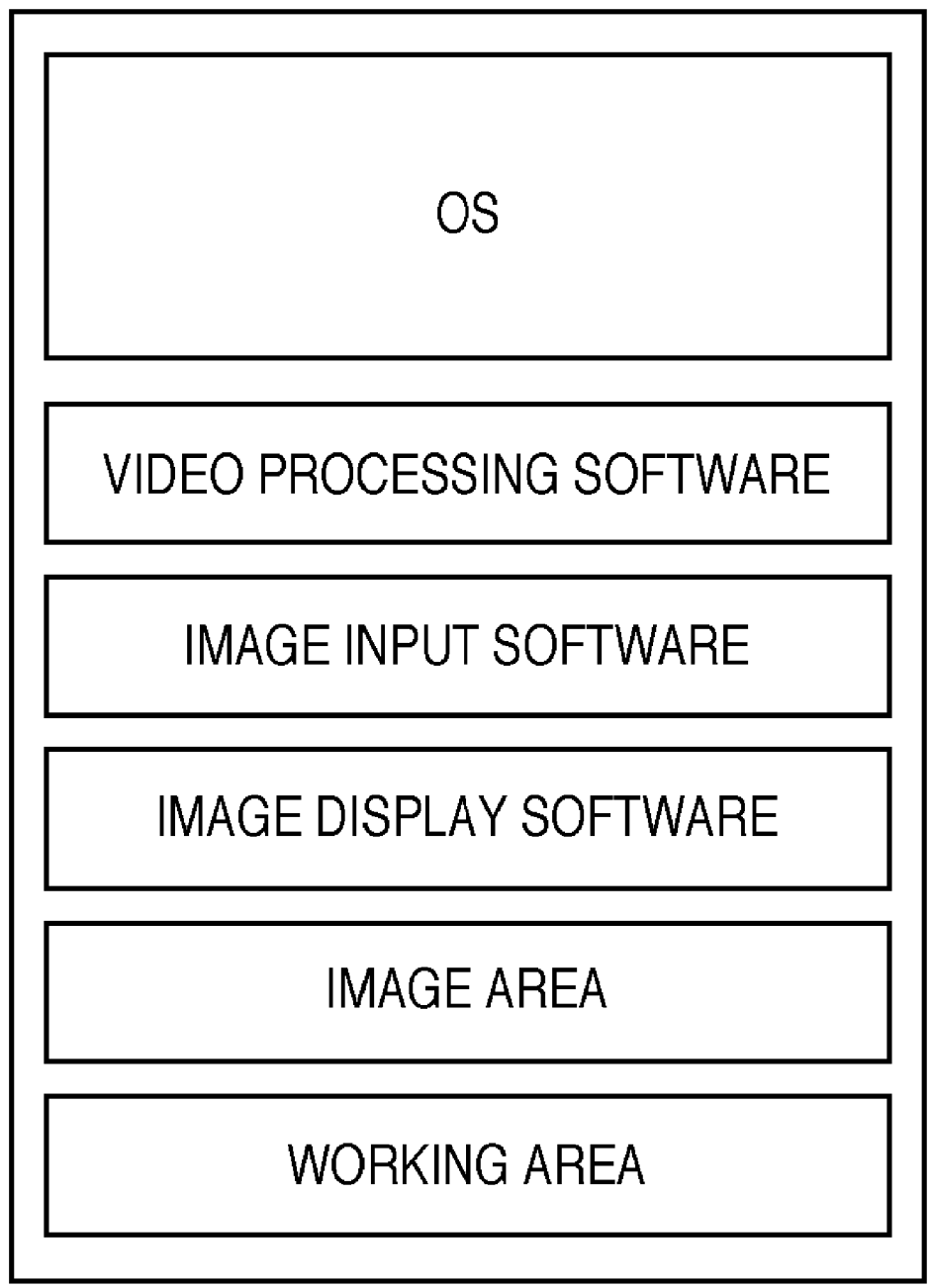
FIG. 10 is a view showing a memory map example of a main memory when the information processing apparatus executes video signal processing.

FIG. 10 is a view showing the memory map on the main memory 102 when the information processing apparatus executes the video signal processing.

The OS is allocated at a head part of a RAM area of the main memory 102. After the OS, video processing software that implements video processing including IP conversion, image input software, image display software that displays a moving picture on the monitor 107, and the like are allocated. Note that the image input software controls the USB controller 108 and video camera 109 to input (capture) video signals field by field. The RAM area also includes an image area used to store moving picture data, and a working area used to store various arithmetic parameters and the like.

Figure 11:
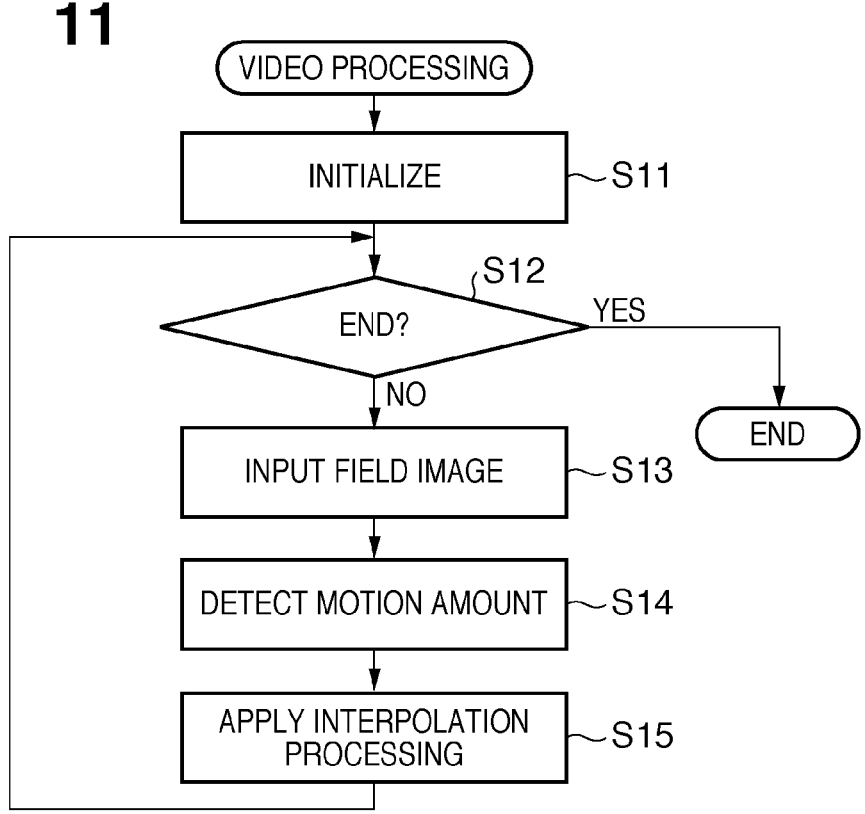
FIG. 11 is a flowchart for explaining video signal processing to be executed by a CPU.

FIG. 11 is a flowchart for explaining the video signal processing executed by the CPU 101.

The CPU 101 executes the video processing software, and initializes the image area, various arithmetic parameters, and the like (S11). The CPU 101 checks if the video signal processing is to end (S12). If the user operates the UI to instruct to end the video signal processing, the CPU 101 ends the video signal processing.

If the video signal processing is to be continued, the CPU 101 inputs a video signal from the video camera 109 for each field, and stores it in the image area (S13). The CPU 101 detects a motion amount of the video signal stored in the image area (S14), executes interpolation processing based on the detected motion amount, and stores a video signal as the IP conversion result in the image area (S15). The process then returns to step S12.

Also, the CPU 101 executes the image display software to display the video signal as the IP conversion result, which is stored in the image area, on the monitor 107.

Figure 12:
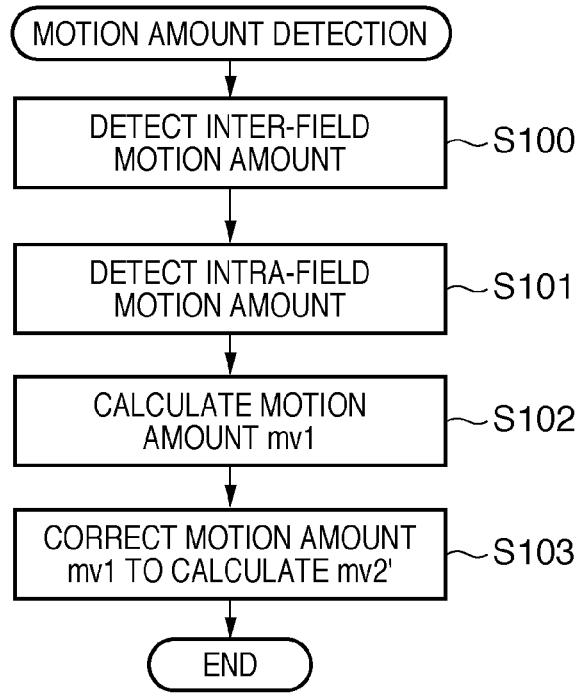
FIG. 12 is a flowchart showing details of motion amount detection processing.

FIG. 12 is a flowchart showing details of the motion amount detection processing (S14).

The CPU 101 detects an inter-field motion amount from the video signal stored in the image area (S100), and detects an intra-field motion amount (S101). Then, the CPU 101 mixes the inter-field motion amount and intra-field motion amount to calculate a motion amount mv1 (S102). The CPU 101 applies the aforementioned two stages of corrections to the motion amount mv1 to calculate a corrected motion amount mv2' (S103).

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-262064, filed Oct. 8, 2008, which is hereby incorporated by reference herein in its entirety.

What is claimed is:

1. A video signal processing apparatus for detecting a motion amount of an object on converting an interlaced-scanning video signal into a progressive-scanning video signal, comprising:
   a motion-amount calculator, configured to calculate the motion amount at a pixel position to be interpolated of a field of interest;
   a coefficient calculator, configured to calculate a difference coefficient between frames based on video signals of two fields, which are adjacent to the field of interest and are separated by one frame;
   an intensity calculator, configured to calculate a motion intensity between fields based on video signals of the field of interest and a field after the field of interest;
   a first corrector, configured to correct the motion amount using a predetermined function; and
   a second corrector, configured to correct the motion amount corrected by the first corrector, based on the difference coefficient and the motion intensity.

2. The apparatus according to claim 1, wherein the predetermined function has characteristics that converge the motion amount to a lower limit when the motion amount assumes a value around the lower limit, and converge the motion amount to an upper limit when the motion amount assumes a value around the upper limit.

3. The apparatus according to claim 1, wherein the motion-amount calculator comprises:
   an intra-field calculation unit, configured to calculate an intra-field motion amount based on values of two pixels which are located on lines adjacent to a line where the pixel to be interpolated is located, and which are adjacent to the pixel to be interpolated;
   an inter-field calculation unit, configured to calculate an inter-field motion amount based on an average value of the two pixels or a value of one of the two pixels, and a value of a pixel corresponding to the pixel to be interpolated on a field before the field of interest; and a motion-amount calculation unit, configured to calculate a motion amount at the pixel position to be interpolated based on the intra-field motion amount and the inter-field motion amount.

4. The apparatus according to claim 1, wherein the coefficient calculator calculates the difference coefficient between the frames based on difference absolute values of values of pixels located at identical positions of predetermined regions having the pixel to be interpolated as a center between the two fields.

5. The apparatus according to claim 1, wherein the intensity calculator generates a frame structure of a predetermined size from the field of interest and the field after the field of interest, and calculates an intensity of an artifact generated in the frame structure as the motion intensity.

6. The apparatus according to claim 1, further comprising an interpolator configured to calculate, based on the motion amount corrected by the second corrector, a value of the pixel to be interpolated from a video signal of the field of interest and a video signal of a field before the field of interest.

7. A video signal processing method of detecting a motion amount of an object on converting an interlaced-scanning video signal into a progressive-scanning video signal, comprising the steps of:

calculating the motion amount at a pixel position to be interpolated of a field of interest;

calculating a difference coefficient between frames based on video signals of two fields, which are adjacent to the field of interest and are separated by one frame;

calculating a motion intensity between fields based on video signals of the field of interest and a field after the field of interest;

correcting the motion amount using a predetermined function; and correcting the motion amount corrected in the first correcting step, based on the difference coefficient and the motion intensity.

8. A non-transitory computer-readable medium storing a computer-executable program for causing a computer to perform a video signal processing method of detecting a motion amount of an object on converting an interlaced-scanning video signal into a progressive-scanning video signal, comprising the steps of:

calculating the motion amount at a pixel position to be interpolated of a field of interest;

calculating a difference coefficient between frames based on video signals of two fields, which are adjacent to the field of interest and are separated by one frame;

calculating a motion intensity between fields based on video signals of the field of interest and a field after the field of interest;

correcting the motion amount using a predetermined function; and correcting the motion amount corrected in the first correcting step, based on the difference coefficient and the motion intensity.

* * * * *